(12) United States Patent
Toyoda et al.

(10) Patent No.: US 10,377,075 B2
(45) Date of Patent: Aug. 13, 2019

(54) BLOW MOLDING APPARATUS

(71) Applicant: DISCMA AG, Hunenberg (CH)

(72) Inventors: Tamotsu Toyoda, Tokyo (JP); Shigeki Morikami, Kanagawa (JP); Yuichi Okuyama, Kanagawa (JP)

(73) Assignee: Discma AG, Zürich (CH)

( * ) Notice: Subject to any disclaimer, the term of this patent is extended or adjusted under 35 U.S.C. 154(b) by 358 days.

(21) Appl. No.: 15/513,094

(22) PCT Filed: Sep. 8, 2015

(86) PCT No.: PCT/JP2015/004572
§ 371 (c)(1),
(2) Date: Mar. 21, 2017

(87) PCT Pub. No.: WO2016/047067
PCT Pub. Date: Mar. 31, 2016

(65) Prior Publication Data
US 2017/0291345 A1    Oct. 12, 2017

(30) Foreign Application Priority Data
Sep. 24, 2014    (JP) ................. 2014-193728

(51) Int. Cl.
*B29C 49/46*  (2006.01)
*B29C 49/58*  (2006.01)
(Continued)

(52) U.S. Cl.
CPC ............. *B29C 49/10* (2013.01); *B29C 49/16* (2013.01); *B29C 49/46* (2013.01); *B29C 49/58* (2013.01);
(Continued)

(58) Field of Classification Search
CPC ... B29C 49/46; B29C 49/58; B29C 2049/465; B29C 2049/4655; B29C 2049/4664; B29C 2049/5803
See application file for complete search history.

(56) References Cited

U.S. PATENT DOCUMENTS 3,233,416 A * 2/1966 Rainwater ............... B29C 49/58
                                                                       264/520
8,109,756 B2    2/2012 Doudement
(Continued)

FOREIGN PATENT DOCUMENTS

CN    1071365 A    4/1993
CN    1777505 A    5/2006
(Continued)

*Primary Examiner* — Robert B Davis
(74) *Attorney, Agent, or Firm* — Eric J. Sosenko; Jonathan P. O'Brien; Honigman LLP

(57) ABSTRACT

A blow molding apparatus for mitigating a difference in flow rates of a liquid supplied from a blow nozzle to a preform. The blow molding apparatus includes a blow nozzle that mates with an open tube portion of a preform and a seal body that opens and closes the blow nozzle. A filling head extends along an axial direction of the blow nozzle and is provided at one end with a liquid supply channel connected to the blow nozzle and with a liquid introduction channel connected to the liquid supply channel from the side. A pressurized liquid supply unit is connected to the liquid introduction channel and supplies a pressurized liquid to the liquid introduction channel. A spiral guide groove is provided around an axial center of the liquid supply channel in an inner peripheral surface of the liquid supply channel.

16 Claims, 3 Drawing Sheets

(51) Int. Cl.
*B29C 49/10* (2006.01)
*B29C 49/16* (2006.01)

(52) U.S. Cl.
CPC ............... *B29C 2049/4664* (2013.01); *B29C 2049/5803* (2013.01); *B29C 2949/78537* (2013.01); *B29C 2949/78588* (2013.01); *B29C 2949/78663* (2013.01); *B29C 2949/78764* (2013.01); *B29C 2949/78857* (2013.01)

(56) References Cited

U.S. PATENT DOCUMENTS

| | | |
|---|---|---|
| 2005/0206045 A1 | 9/2005 | Desanaux et al. |
| 2006/0047334 A1 | 3/2006 | Houston et al. |
| 2006/0141090 A1 | 6/2006 | Lahouati |
| 2013/0074979 A1 | 3/2013 | Krulitsch |
| 2013/0106027 A1 | 5/2013 | Maki et al. |
| 2013/0164404 A1 | 6/2013 | Maki et al. |
| 2019/0016037 A1 * | 1/2019 | Nascimbeni ............ B29C 49/46 |

FOREIGN PATENT DOCUMENTS

| | | | | |
|---|---|---|---|---|
| CN | 2818121 Y | 9/2006 | | |
| CN | 201195387 Y | 2/2009 | | |
| CN | 101774271 A | 7/2010 | | |
| DE | 102014015201 A1 * | 4/2016 | ............ | B29C 49/06 |
| JP | 06024754 B2 * | 4/1994 | ............ | B29C 49/58 |
| JP | 2005-069250 A | 3/2005 | | |
| JP | 2014-128911 A | 7/2014 | | |
| WO | 2005044540 A1 | 5/2005 | | |

* cited by examiner

BLOW MOLDING APPARATUS

FIELD

The present invention relates to a blow molding apparatus that blow-molds a preform of a bottomed cylindrical shape into a container of a predetermined shape and, more particularly, relates to one that uses a liquid as a pressurized fluid for performing blow molding.

BACKGROUND

Containers made of a resin, as represented by bottles made of oriented polypropylene (OPP) and bottles made of polyethylene terephthalate (PET) (PET bottles), are used in various usages, such as for beverages, for food, and for cosmetics. Such containers are generally formed into a predetermined shape by heating a preform made of the resin formed into a bottomed cylindrical shape by injection molding or the like, to a temperature where a stretching effect can be expressed and, in this state, using a blow molding apparatus to perform biaxial stretch blow molding.

As the blow molding apparatus, one is known that uses a pressurized liquid instead of pressurized air as a pressurized fluid to be supplied into the preform. In this situation, by using as the liquid for pressurization a content liquid, such as a beverage, a cosmetic, or a drug that is to be ultimately filled in the container, a process of filling the container with the content liquid can be omitted to simplify a production process thereof and a configuration of the blow molding apparatus.

For example, JP 2014-128911 A describes a blow molding apparatus having: a mold for blow molding to which a preform heated to a stretchable temperature is mounted; a blow nozzle that mates with an open tube portion of the preform mounted to the mold; a filling head that extends along an axial direction of the blow nozzle and is provided at one end with a liquid supply channel connected to the blow nozzle and a liquid introduction channel that extends orthogonally to this liquid supply channel and is connected to this liquid supply channel; and a pressurized liquid supply unit, such as a servo plunger, that is connected to the liquid introduction channel and supplies a pressurized liquid to this liquid introduction channel; wherein the preform is molded into a bottle of a shape conforming to a cavity of the mold by supplying the liquid supplied from the pressurized liquid supply unit into the preform via the blow nozzle and stretching the preform in a horizontal direction (radial direction) while stretching the preform in a vertical direction (axial direction) by a stretching rod.

SUMMARY

In the above blow molding apparatus, the liquid supply channel provided in the filling head is provided extending in a direction along the axial direction of the blow nozzle while the liquid introduction channel is provided extending in a direction orthogonal to the liquid supply channel—that is, a horizontal direction; the liquid supplied from the pressurized liquid supply unit to the liquid introduction channel is supplied from the liquid introduction channel to the liquid supply channel with a flow direction thereof bent. In such a configuration, a flow rate of the liquid at an outer-peripheral-side portion of this bend becomes greater than a flow rate of the liquid at an inner-peripheral-side portion of this bend; therefore, there is a problem where a flow rate of the liquid flowing in the liquid supply channel—that is, the liquid supplied from the blow nozzle into the preform—differs from one side to another in a radial direction thereof and eccentricity and uneven thickness arise in the blow-molded bottle.

The present invention is made in view of such a problem and has as an object to provide a blow molding apparatus that can mitigate a difference in flow rates of a liquid supplied from a blow nozzle to a preform and prevent eccentricity and uneven thickness from arising in a blow-molded bottle.

A blow molding apparatus incorporating the principles of the present invention is a blow molding apparatus that supplies a pressurized liquid to a preform of a bottomed-cylinder shape mounted in a mold for blow molding and molds this preform into a shape conforming to a cavity of the mold, having: a blow nozzle that mates with an open tube portion of the preform; a seal body that opens and closes the blow nozzle; a filling head that extends along an axial direction of the blow nozzle and is provided at one end with a liquid supply channel connected to the blow nozzle and a liquid introduction channel connected to the liquid supply channel from the side; and a pressurized liquid supply unit that is connected to the liquid introduction channel and supplies the pressurized liquid to this liquid introduction channel; wherein a spiral guide groove is provided around an axial center of the liquid supply channel in an inner peripheral surface of this liquid supply channel.

In the blow molding apparatus of the present invention, preferably, the liquid introduction channel is orthogonal to the liquid supply channel.

In the blow molding apparatus of the present invention, preferably, the seal body is formed with a diameter smaller than an inner diameter of the liquid supply channel and greater than an inner diameter of the blow nozzle, disposed inside the liquid supply channel, and can move along an axial direction of this liquid supply channel between a closed position of abutting the blow nozzle and closing this blow nozzle and an opened position of being separated from the blow nozzle and opening this blow nozzle, at least a portion of the seal body in the opened position being disposed on a radial-direction inner side of the guide groove.

In the blow molding apparatus of the present invention, preferably, a liquid discharge channel connected to the liquid supply channel from the side is provided in the filling head between the liquid introduction channel and the guide groove and, when the seal body is in the closed position, liquid supplied from the pressurized liquid supply unit to the liquid supply channel via the liquid introduction channel is returned to the pressurized liquid supply unit through the liquid discharge channel.

According to the present invention, a flow in a rotational direction can be imparted to the liquid flowing in the liquid supply channel by the spiral guide groove provided in the inner peripheral surface of the liquid supply channel to equalize a difference in flowrates of the liquid arising from one side to another in a radial direction of the liquid supply channel; therefore, a difference in flowrates of the liquid supplied from the blow nozzle to the preform can be mitigated and eccentricity and uneven thickness arising in a blow-molded bottle can be prevented.

DESCRIPTION OF EMBODIMENTS

The present invention is illustrated and described more specifically with reference to the drawings.

Figure 1:
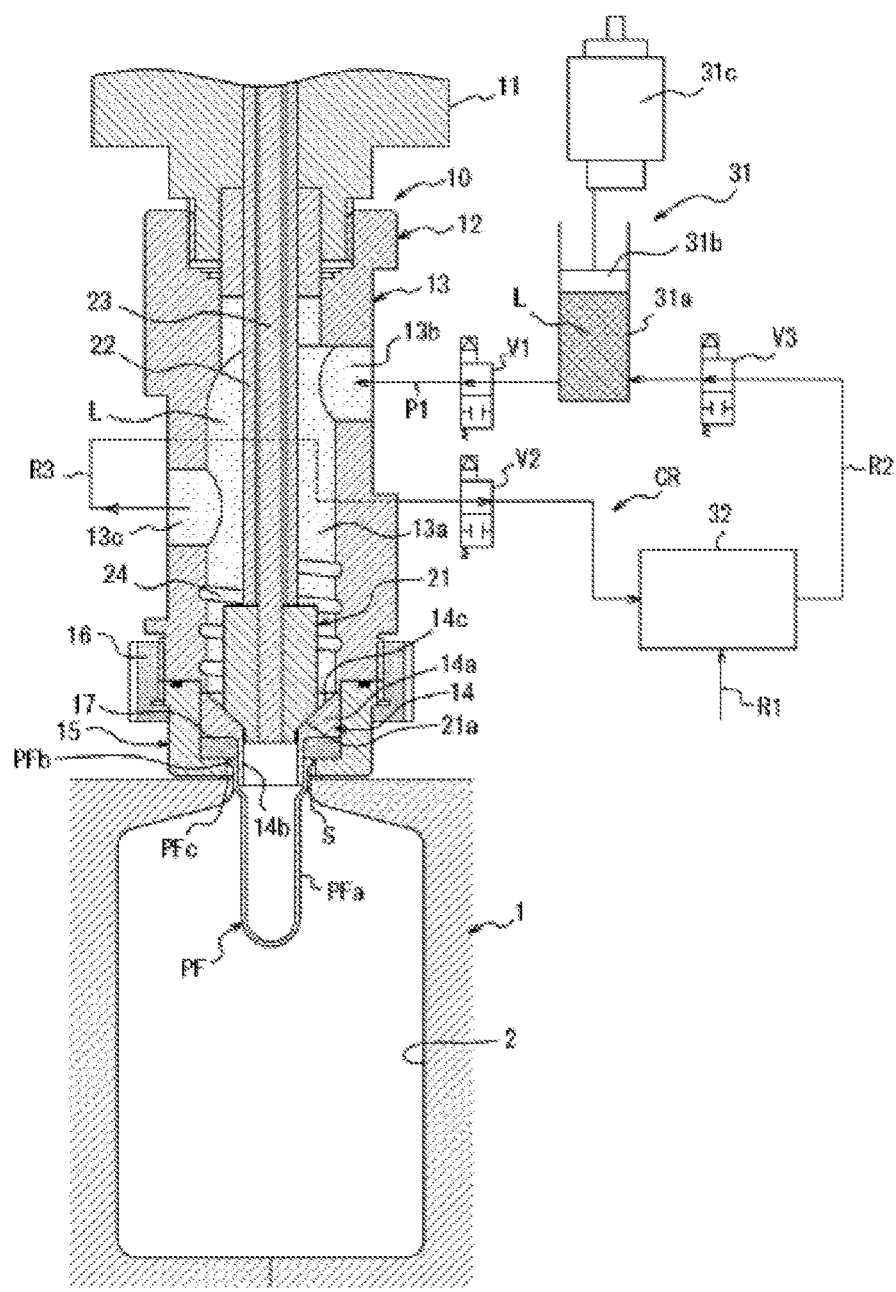
FIG. 1 is an explanatory diagram schematically illustrating a blow molding apparatus embodying the present invention.

As illustrated in FIG. 1, a blow molding apparatus that is one embodiment of the present invention has a mold 1 for blow molding. A cavity 2 of this mold 1 is of a bottle shape and is opened upward at an upper surface of the mold 1. While details are not illustrated, the mold 1 can be opened laterally; by opening the mold 1, a product where a blow-molded bottle is filled with a content liquid can be extracted from the mold 1.

A preform PF that is blow-molded by this blow molding apparatus and is formed into a bottle can be mounted in the mold 1. As the preform PF, one formed in an overall bottomed-cylinder shape by a resin material such as polypropylene (PP) or polyethylene terephthalate (PET) where a cylindrical open tube portion PFb is integrally provided to an upper end of this main body portion PFa, which takes on a test-tube shape, and a neck ring PFc is integrally provided to a lower-end portion of the open tube portion PFb can be used. This preform PF has the main body portion PFa thereof disposed in the cavity 2 of the mold 1 along an axial center thereof and is mounted in the mold 1 in a state where the neck ring PFc abuts the upper surface of the mold 1 and the open tube portion PFb protrudes outside of the mold 1 (upward in FIG. 1).

A nozzle unit 10 is provided on an upper side of the mold 1 so as to be able to move in a vertical direction relative to the mold 1. This nozzle unit 10 is of a configuration where a cartridge-shaped filling unit 12 is mounted to a lower end of a support body 11, the filling unit 12 being provided with a filling head 13, a blow nozzle 14, and a holding member 15.

Figure 2:
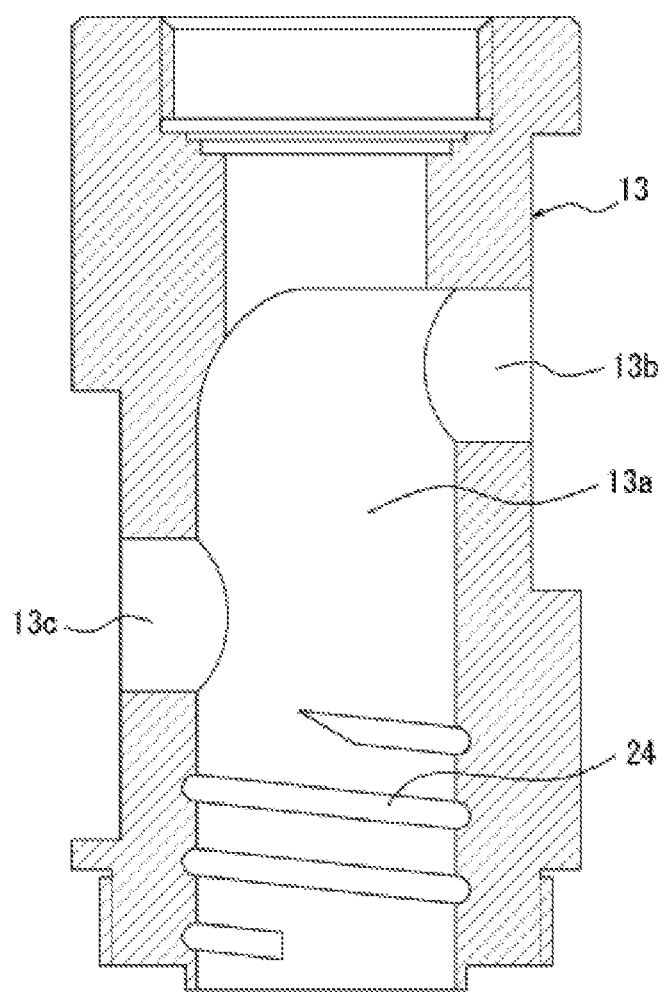
FIG. 2 is an enlarged cross-sectional view of a filling head illustrated in FIG. 1.

For example, the filling head 13, which is made of a steel material, is formed cylindrically overall and is mounted to the lower end of the support body 11 by a screw connection so as to be detachable. As illustrated in FIG. 2, the filling head 13 has a liquid supply channel 13a therein. The liquid supply channel 13a extends straight vertically along an axial direction of the mold 1, and a cross-sectional shape thereof is circular.

A liquid introduction channel 13b connected to the liquid supply channel 13a from the side thereof is provided in the filling head 13. In the illustrated situation, the liquid introduction channel 13b extends in a direction orthogonal to the liquid supply channel 13a, connecting to the liquid supply channel 13a at one end thereof; another end thereof is opened to an outer peripheral surface of a sidewall of the filling head 13.

Furthermore, a liquid discharge channel 13c connected to the liquid supply channel 13a from the side thereof is provided in the filling head 13. In the illustrated situation, the liquid discharge channel 13c is orthogonal to the liquid supply channel 13a on a lower side of the liquid introduction channel 13b and extends to a side in a radial direction opposite from the liquid introduction channel 13b, connecting to the liquid supply channel 13a at one end thereof; another end thereof is opened to the outer peripheral surface of the sidewall of the filling head 13.

The blow nozzle 14 is provided with an annular nozzle mounting portion 14a and a cylindrical nozzle main body portion 14b protruding downward from the nozzle mounting portion 14a. The blow nozzle 14 is disposed coaxially with the liquid supply channel 13a at one end (lower end in the illustrated situation) of this liquid supply channel 13a, and an axial direction of the nozzle main body portion 14b thereof also matches an axial direction of the preform PF in a state of being mounted in the mold 1.

An upper surface of the nozzle mounting portion 14a of the blow nozzle 14 facing a side of the liquid supply channel 13a is a conical seal surface 14c inclined downward diametrically; the nozzle main body portion 14b is opened to an axial center of this seal surface 14c and communicated to the liquid supply channel 13a.

The holding member 15 is formed in a ring shape that houses the blow nozzle 14 on an inner side thereof and is installed to a lower end of the filling head 13 by a mounting ring 16, which is screwed to an outer periphery of the filling head 13. A ring-shaped spacer block 17 is locked on an inner-side lower-end side of the holding member 15; the blow nozzle 14 is fixed to the lower end of the filling head 13 by the nozzle mounting portion 14a being interposed between this spacer block 17 and the lower end of the filling head 13.

The nozzle unit 10 can move vertically relative to the mold 1; when the nozzle unit 10 is lowered to a lower end, the nozzle main body portion 14b of the blow nozzle 14 mates with an inner side of the open tube portion PFb of the preform PF mounted in the mold 1 and the neck ring PFc is interposed between a lower end of the holding member 15 and the upper surface of the mold 1 such that the preform PF is held in a perpendicular mounting posture relative to the mold 1.

A seal body 21 for opening and closing the blow nozzle 14 is disposed inside the liquid supply channel 13a. The seal body 21 is formed in a short cylindrical shape of a diameter smaller than an inner diameter of the liquid supply channel 13a and greater than an inner diameter of the nozzle main body portion 14b of the blow nozzle 14, and a tapered abutting surface 21a is provided at a lower-end surface thereof. The abutting surface 21a has an incline angle identical to that of the seal surface 14c provided to the blow nozzle 14; the seal body 21 can close the blow nozzle 14 by the abutting surface 21a closely contacting the seal surface 14c.

A shaft body 22 of an elongated cylindrical-rod shape is disposed inside the liquid supply channel 13a along an axial center thereof. This shaft body 22 is supported by the support body 11 and can move in a vertical direction relative to the support body 11 and the filling head 13. The seal body 21 is fixed coaxially to a lower end of the shaft body 22 and can move vertically along an axial direction of the liquid supply channel 13a inside the liquid supply channel 13a together with the shaft body 22. When the shaft body 22 moves to a lower stroke end, the seal body 21 enters a closed position, the abutting surface 21a thereof abutting the seal surface 14c of the blow nozzle 14 such that the blow nozzle 14—that is, the nozzle main body portion 14b—is closed by the seal body 21. Meanwhile, when the seal body 21 moves upward together with the shaft body 22 such that this seal body 21 enters an opened position, the abutting surface 21a thereof separates from the seal surface 14c of the blow nozzle 14 such that the blow nozzle 14—that is, the nozzle main body portion 14b—is opened, communicating the liquid supply channel 13a and the nozzle main body portion 14b.

The shaft body 22 is hollow, and a stretching rod 23 is mounted on an inner side thereof so as to be able to slide.

The stretching rod 23 can move in an axial direction relative to the shaft body 22, and a lower end thereof can protrude from a lower end of the seal body 21. The stretching rod 23 can stretch the preform PF in a vertical direction (axial direction) by moving downward toward an inside of the cavity 2 of the mold 1 from the lower end of the seal body 21.

Note that a portion of the seal body 21 that guides the stretching rod 23 is preferably made of a polyether ether ketone (PEEK) resin.

As illustrated in FIG. 2, a guide groove 24 is provided in an inner peripheral surface of the liquid supply channel 13a provided in the filling head 13. The guide groove 24 has a substantially semicircular cross-sectional shape and is formed in a spiral shape extending over a plurality of revolutions along the inner peripheral surface of the liquid supply channel 13a around the axial center of the liquid supply channel 13a. The guide groove 24 can impart to a liquid L flowing inside the liquid supply channel 13a from a side of the liquid introduction channel 13b to a side of the blow nozzle 14 a flow in a rotational direction around the axial center of this liquid supply channel 13a—that is, a spiral flow. Note that the cross-sectional shape of the guide groove 24 is not limited to a semicircle and can be various shapes such as a rectangular shape.

In the present embodiment, the guide groove 24 is provided in the inner peripheral surface at a portion between a portion where the liquid supply channel 13a connects to the liquid discharge channel 13c and a portion where the liquid supply channel 13a connects to the blow nozzle 14. Moreover, the seal body 21 is configured such that when the closed position is entered into, at least one portion of this seal body 21 is disposed on a radial-direction inner side of the guide groove 24 and at least one portion of an outer peripheral surface of this seal body 21 opposes the guide groove 24. Therefore, when the seal body 21 enters the opened position and the blow nozzle 14 is opened, the liquid L supplied from the liquid introduction channel 13b to the liquid supply channel 13a flows in a ring-shaped flow path between the outer peripheral surface of the seal body 21 and the inner peripheral surface of the liquid supply channel 13a; the guide groove 24 is provided in the inner peripheral surface of the liquid supply channel 13a in this ring-shaped flow path. By this, the flow in the rotational direction can be efficiently imparted to the liquid L flowing inside the liquid supply channel 13a by the guide groove 24.

As illustrated in FIG. 1, a plunger pump 31 and a liquid circulation unit 32 as a pressurized liquid supply unit are connected to the nozzle unit 10.

The plunger pump 31 is provided with a cylinder 31a and a plunger 31b mounted in this cylinder 31a so as to be able to move along an axial direction; a discharge port thereof is connected to the liquid introduction channel 13b of the filling head 13 by a supply pipe P1.

In the illustrated situation, the plunger pump 31 is of a servo-plunger type provided with an electric motor (servo motor) 31c as a drive source; the plunger 31b is driven by the electric motor 31c and actuates in the axial direction in the cylinder 31a. Moreover, the plunger pump 31 can supply the pressurized liquid L to the liquid introduction channel 13b by the plunger 31b actuating.

The liquid circulation unit 32 has a function of adjusting the liquid L to a predetermined temperature while newly replenishing the liquid L from a replenishing pipe R1, supplying the liquid L to the plunger pump 31 through an intermediate pipe R2, and circulating the liquid L between the plunger pump 31 and the liquid supply channel 13a while adjusting the liquid L to a predetermined temperature. That is, the liquid circulation unit 32 can, when a state is entered into where the seal body 21 is in the closed position and the blow nozzle 14 is closed, return the liquid L supplied from the plunger pump 31 to the liquid supply channel 13a via the liquid introduction channel 13b to the plunger pump 31 through the liquid discharge channel 13c, a discharge pipe R3 connected thereto, and the intermediate pipe R2. By this, the liquid L supplied from the plunger pump 31 to the liquid supply channel 13a via the liquid introduction channel 13b can be circulated in a circulation path CR, which includes the liquid circulation unit 32 and the plunger pump 31, and a temperature of the liquid L supplied to the liquid supply channel 13a can be continuously maintained at a predetermined temperature.

Three magnetic circulation-path on-off valves V1, V2, V3 are provided in the circulation path CR; predetermined pipes are opened and closed by the circulation-path on-off valves V1, V2, V3 in correspondence with each process of blow molding.

An extra-opening pressurizing air space S is partitioned and formed surrounding an outer periphery of the open tube portion PFb of the preform PF mounted in the mold 1. A configuration can also be such that a pressurized air supply unit (not illustrated) is connected to this extra-opening pressurizing air space S and, by increasing an internal pressure of the extra-opening pressurizing air space S by pressurized air supplied from the pressurized air supply unit, diameter-enlargement deformation of the open tube portion PFb during blow molding is prevented and a sealing force between the open tube portion PFb and the blow nozzle 14 is increased.

With a blow molding apparatus of the present invention of such a configuration, by opening the blow nozzle 14 by moving the seal body 21 to the opened position in a state where the circulation-path on-off valves V2, V3 are closed to stop circulation of the liquid L along the circulation path CR, the liquid L supplied from the plunger pump 31 to the liquid supply channel 13a via the liquid introduction channel 13b can be supplied (filled) into the preform PF through the nozzle main body portion 14b of the blow nozzle 14 to blow mold the preform PF into a shape conforming to the cavity 2 of the mold 1. Moreover, by stretching the preform PF in the vertical direction (axial direction) by the stretching rod 23 before (or at the same time as) supplying the liquid L to the preform PF, biaxial stretch blow molding can be performed for the preform PF.

Figure 3:
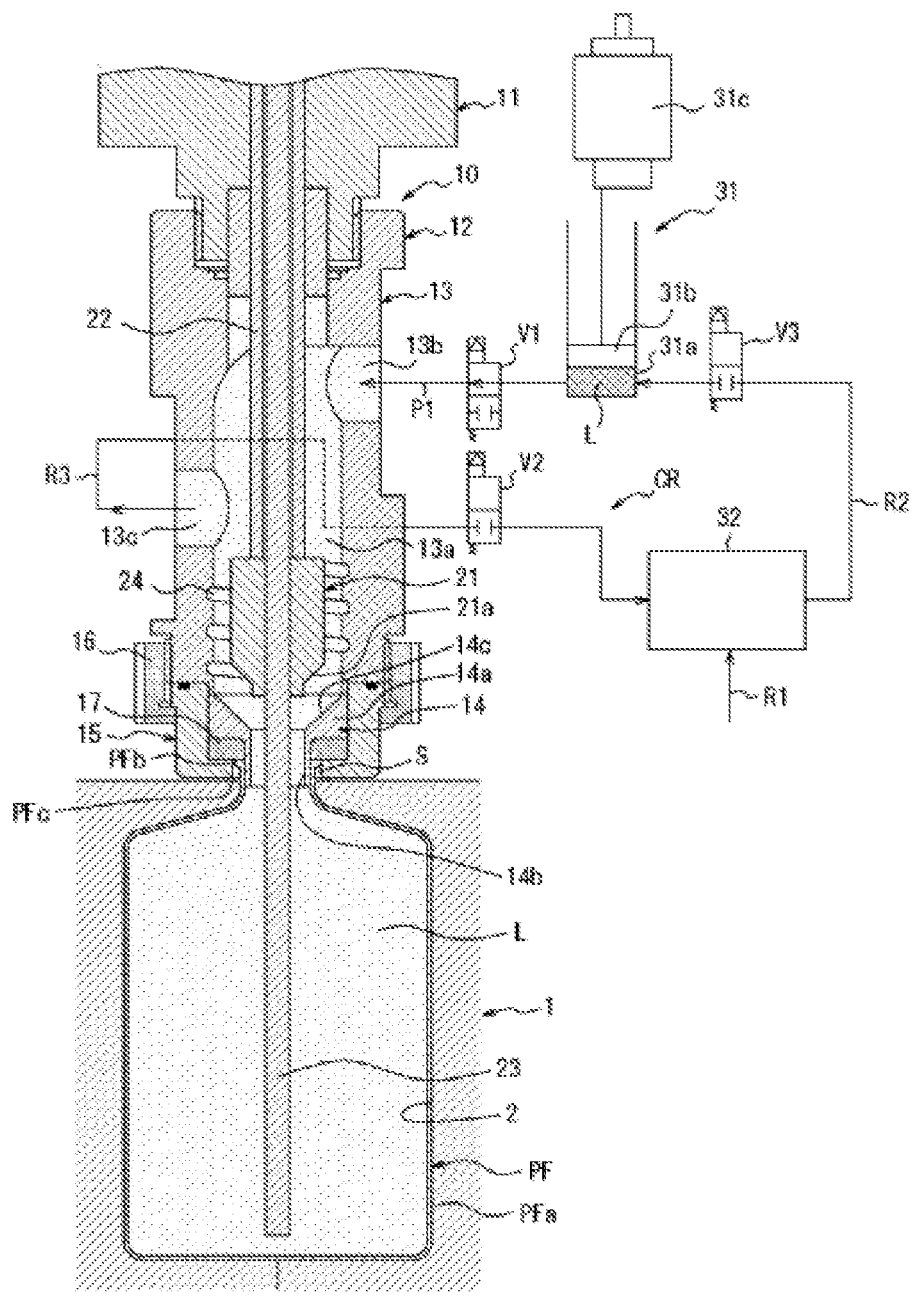
FIG. 3 is a diagram illustrating a state where a pressurized liquid is supplied to a preform to perform blow molding.

As described above, the liquid introduction channel 13b provided in the filling head 13 is connected from the side to the liquid supply channel 13a provided coaxially with the nozzle main body portion 14b of the blow nozzle 14; therefore, the liquid L supplied from the plunger pump 31 to the liquid introduction channel 13b during blow molding is supplied from the liquid introduction channel 13b to the liquid supply channel 13a with the flow direction thereof bent. Because of this, a flowrate of the liquid L at an outer-peripheral-side portion of this bend is greater than a flowrate of the liquid L at an inner-peripheral-side portion, and a flowrate of the liquid L flowing inside the liquid supply portion 13a differs from one side (left side in FIG. 3) to another side (right side in FIG. 3) in a radial direction thereof. However, with the blow molding apparatus of the present invention, the spiral guide groove 24 is provided in the inner peripheral surface of the liquid supply channel 13a to impart to the liquid L flowing in the liquid supply channel 13a the flow in the rotational direction around the axial center of the liquid supply channel 13a; therefore, the difference in the flowrates of the liquid L arising due to the liquid introduction channel 13b being provided bent relative to the liquid supply channel 13a can be equalized. Therefore, with the liquid L supplied from the liquid supply channel 13a to the preform PF through the blow nozzle 14 as well, a difference in flowrates thereof can be mitigated. By this, the preform PF can be stretched evenly in a forward direction of the radial direction around the axial center thereof by the pressurized liquid L supplied from the open tube portion PFb and an eccentricity where an axial direction of the blow-molded bottle is shifted or an uneven thickness where a thickness of the blow-molded bottle differs in a circumferential direction can be prevented from arising.

Furthermore, by configuring such that at least a portion of the seal body 21 in the opened position is disposed on the radial-direction inner side of the guide groove 24, the liquid L can be flowed along the guide groove 24 in a narrow, ring-shaped flow path between the outer peripheral surface of the seal body 21 and the inner peripheral surface of the liquid supply channel 13a; therefore, the flow in the rotational direction can be efficiently imparted by this guide groove 24. By this, the difference in the flowrates of the liquid L supplied from the liquid supply channel 13a to the preform PF through the blow nozzle 14 can be further effectively mitigated and eccentricity or uneven thickness being imparted to the blow-molded bottle can be reliably prevented.

Furthermore, by a configuration where the liquid discharge channel 13c for returning to the plunger pump 31 and circulating the liquid L is connected to the liquid supply channel 13a between the liquid introduction channel 13b and the guide groove 24, even in a situation where a configuration of circulating the liquid L is adopted, by providing the guide groove 24 in a vicinity of the blow nozzle 14, the difference in the flowrates of the liquid L supplied from the liquid supply channel 13a to the preform PF through the blow nozzle 14 can be effectively mitigated.

The present invention is not limited to the above embodiment, and it is needless to say that various modifications are possible within a range that does not depart from the spirit thereof.

For example, in the above embodiment, the liquid introduction channel 13b is configured to extend in the direction orthogonal to the axial direction of the liquid supply channel 13a; however, the present invention is not limited thereto, and the liquid introduction channel 13b can also be configured to extend in a direction inclining at any angle no less than 0 degrees and less than 90 degrees relative to the axial direction of the liquid supply channel 13a.

Furthermore, in the above embodiment, only one guide groove 24 is provided in the inner peripheral surface of the liquid supply channel 13a; however, a configuration can also be adopted where a plurality of guide grooves 24 is provided. In this situation, the plurality of guide grooves 24 can be provided in an aspect of multiple threads.

Furthermore, in the above embodiment, the pressurized liquid supply unit is the plunger pump 31 of the servo-plunger type where the plunger 31b is driven by the electric motor 31c; however, the pressurized liquid supply unit is not limited thereto and can also be a plunger pump 31 of a configuration driven by another drive mechanism such as a hydraulic cylinder or an air cylinder. Moreover, as the pressurized liquid supply unit, a pump or the like of another format other than the plunger pump 31 can also be used.

Furthermore, in the above embodiment, the liquid L is configured to be circulated by the circulation path CR; however, the present invention is not limited thereto, and the liquid L can also be configured to not be circulated as long as this is a configuration where the pressurized liquid L can be supplied from the plunger pump 31 into the preform PF through the liquid introduction channel 13b, the liquid supply channel 13a, and the blow nozzle 14.

Furthermore, a configuration can also be adopted where the preform PF is stretched to inflate in both the vertical direction (axial direction) and a horizontal direction (radial direction) by a pressure alone of the liquid L supplied from the plunger pump 31, without using the stretching rod 23, to be made into a bottle of a shape conforming to the cavity 2 of the mold 1.

Furthermore, as the preform PF, one of a shape where the main body portion PFa and the open tube portion PFb are had but no neck ring PFc is provided can also be used. Moreover, a material of the preform PF is not limited to polypropylene and can also be another resin material such as polyethylene terephthalate.

The invention claimed is:

1. A blow molding apparatus for supplying a pressurized liquid to a preform with a bottomed-cylinder shape mounted in a mold for blow molding the preform into a shape conforming to a cavity of the mold, the blow molding apparatus comprising:
   a blow nozzle configured to mate with an open tube portion of the preform;
   a seal body moveable between open and closed positions with the blow nozzle;
   a filling head that extends along an axial direction of the blow nozzle, the filling head provided at one end with a liquid supply channel connected to the blow nozzle and a liquid introduction channel connected to the liquid supply channel from a side of the filling head;
   a pressurized liquid supply unit connected to the liquid introduction channel and configured to supply the pressurized liquid to the liquid introduction channel; and
   a spiral guide groove provided around an axial center of the liquid supply channel in an inner peripheral surface of the liquid supply channel.

2. The blow molding apparatus according to claim 1, wherein the liquid introduction channel is orthogonal to the liquid supply channel.

3. The blow molding apparatus according to claim 1, wherein the seal body has a diameter smaller than an inner diameter of the liquid supply channel and greater than an inner diameter of the blow nozzle, the seal body being disposed within the liquid supply channel and moveable along an axial direction of the liquid supply channel between a closed position abutting and closing the blow nozzle and an opened position where the seal body is separated from and opens the blow nozzle, in the opened position at least a portion of the seal body being disposed on a radial-direction inner side of the guide groove.

4. The blow molding apparatus according to claim 2, wherein the seal body has a diameter smaller than an inner diameter of the liquid supply channel and greater than an inner diameter of the blow nozzle, the seal body being disposed inside the liquid supply channel and moveable along an axial direction of the liquid supply channel between a closed position abutting and closing the blow nozzle and an opened position where the seal body is separated from and opens the blow nozzle, in the opened position at least a portion of the seal body being disposed on a radial-direction inner side of the guide groove.

5. The blow molding apparatus according to claim 1, further comprising a liquid discharge channel coupled to the liquid supply channel from a side of the filling head and between the liquid introduction channel and the guide groove and, wherein when the seal body is in the closed position, liquid supplied from the pressurized liquid supply unit to the liquid supply channel via the liquid introduction channel is returned to the pressurized liquid supply unit through the liquid discharge channel.

6. A blow molding apparatus for forming a container from a preform by injection of a pressurized liquid into the preform, the apparatus comprising:
- a blow nozzle defining an outlet from the apparatus for injection of the liquid into the preform;
- a filling head coupled to the blow nozzle, the filling head having an inner surface defining liquid supply channel extending through the filling head, the liquid supply channel being coaxial with the outlet of the blow nozzle, a liquid introduction channel also defined in the filling head and being coupled to the liquid supply channel, the liquid introduction channel being angled relative to the liquid supply channel;
- a seal body located within the liquid supply channel and moveable between a closed position where the seal body engages the blow nozzle and an open position where the seal body is disengaged from the blow nozzle; and
- a groove provided in the inner surface of the filling head at a location between the liquid introduction channel and the outlet.

7. The blow molding apparatus of claim 6, wherein the groove is a spiral groove.

8. The blow molding apparatus of claim 6, wherein the groove is a spiral groove about a central axis defined by the liquid supply channel.

9. The blow molding apparatus of claim 6, wherein the groove is semi-circular in cross section.

10. The blow molding apparatus of claim 6, wherein the groove is at least partially located radially outward of the seal body.

11. The blow molding apparatus of claim 6, wherein, when the seal body is in the open position, the groove is at least partially located radially outward of the seal body.

12. The blow molding apparatus of claim 6, wherein, when the seal body is in the open position, the groove is at least partially located radially about of the seal body.

13. The blow molding apparatus of claim 6, wherein, when the seal body is in the open position, an annular channel is defined between the seal body and the inner surface the groove, the groove being at least partially located in the annular channel.

14. The blow molding apparatus of claim 6, wherein the liquid introduction channel is angled relative to the liquid supply channel at an angle of about 90 degrees.

15. The blow molding apparatus of claim 6, further comprising a liquid discharge channel also defined in the filling head and being coupled to the liquid supply channel, the liquid discharge channel being located between the liquid introduction channel and the outlet.

16. The blow molding apparatus of claim 15, wherein the groove is at least partially located between the liquid discharge channel and the outlet.

* * * * *